July 2, 1929.  R. J. ALTGELT ET AL  1,719,743
TRACTOR PLOW STRUCTURE
Filed Aug. 13, 1926    5 Sheets-Sheet 3
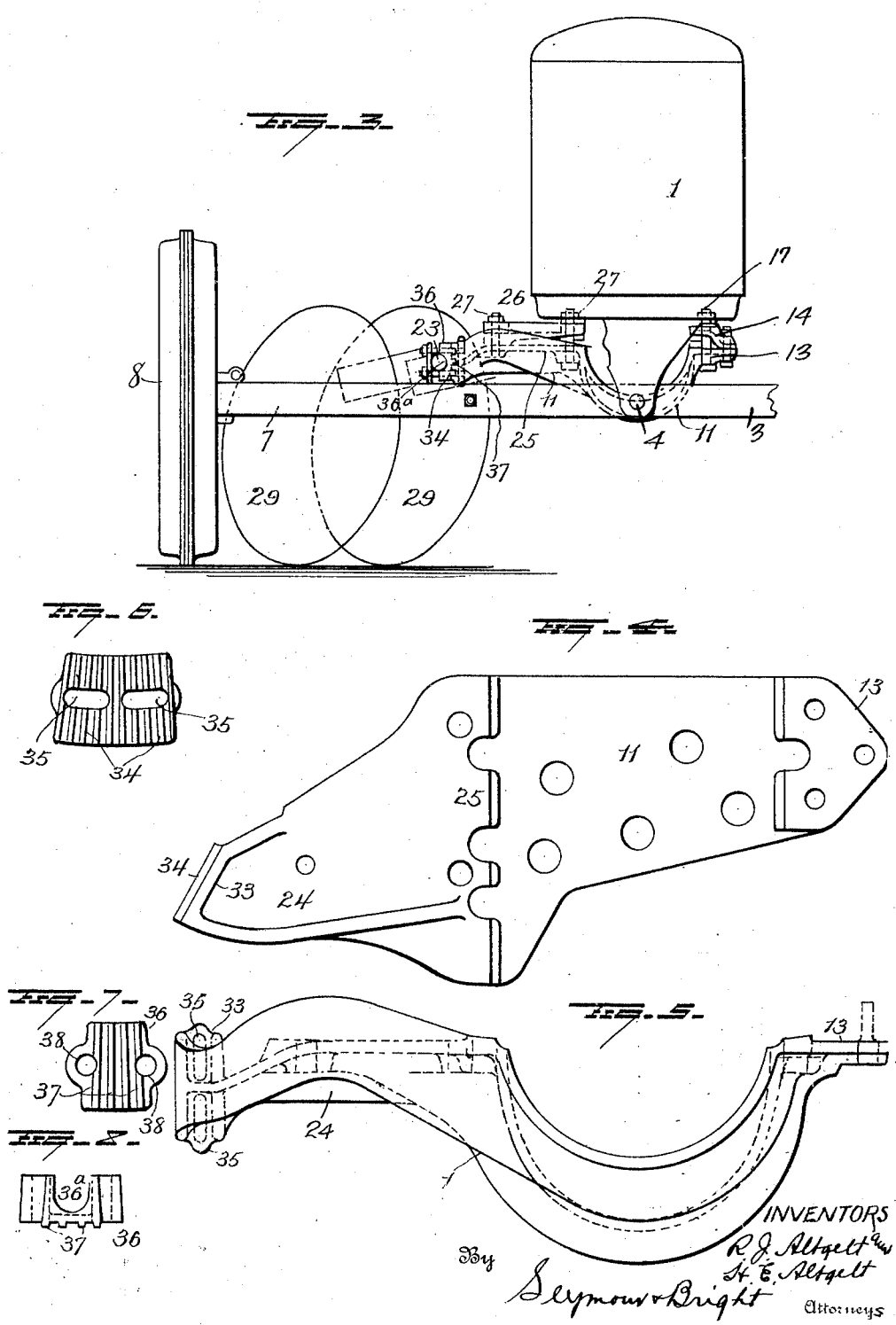

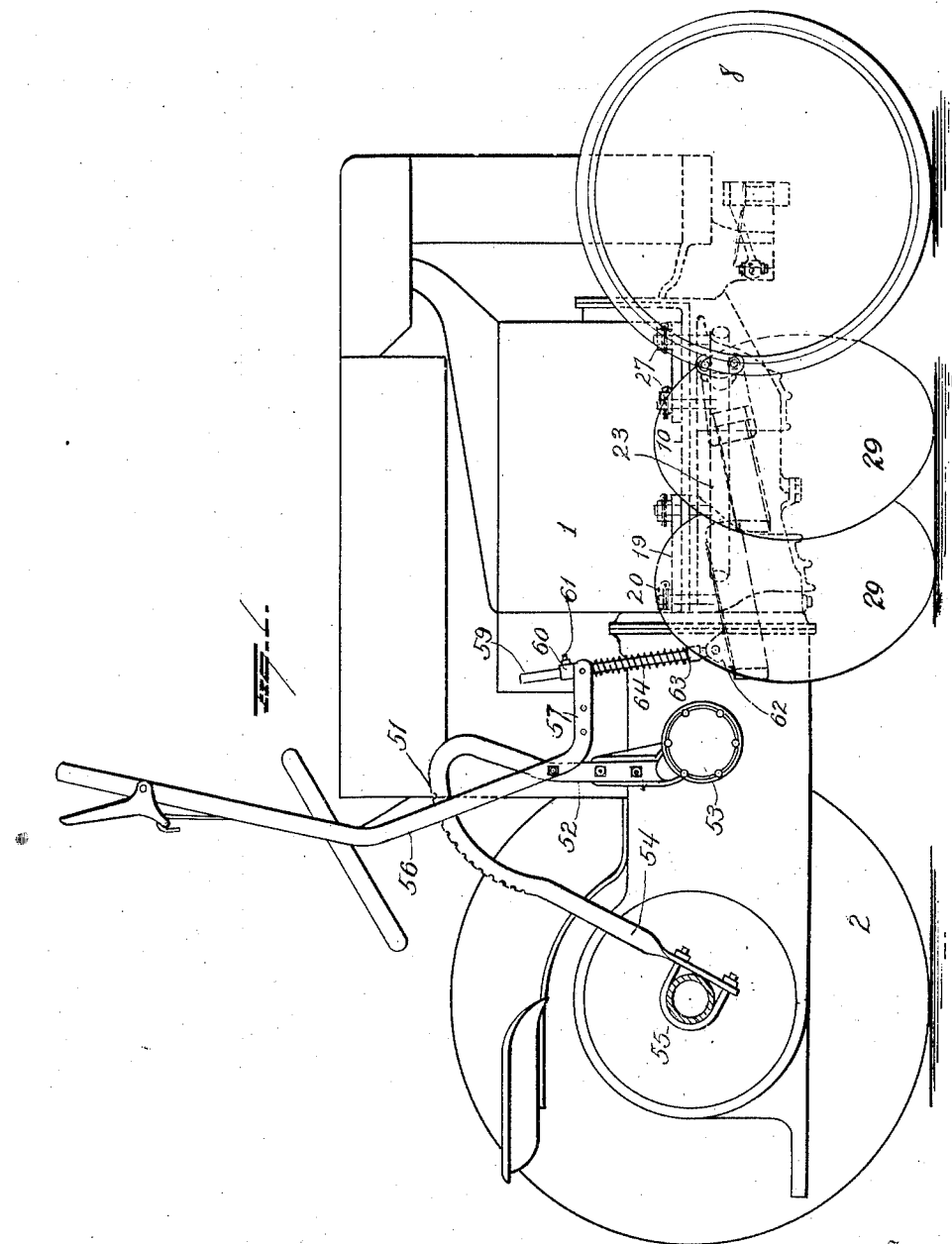

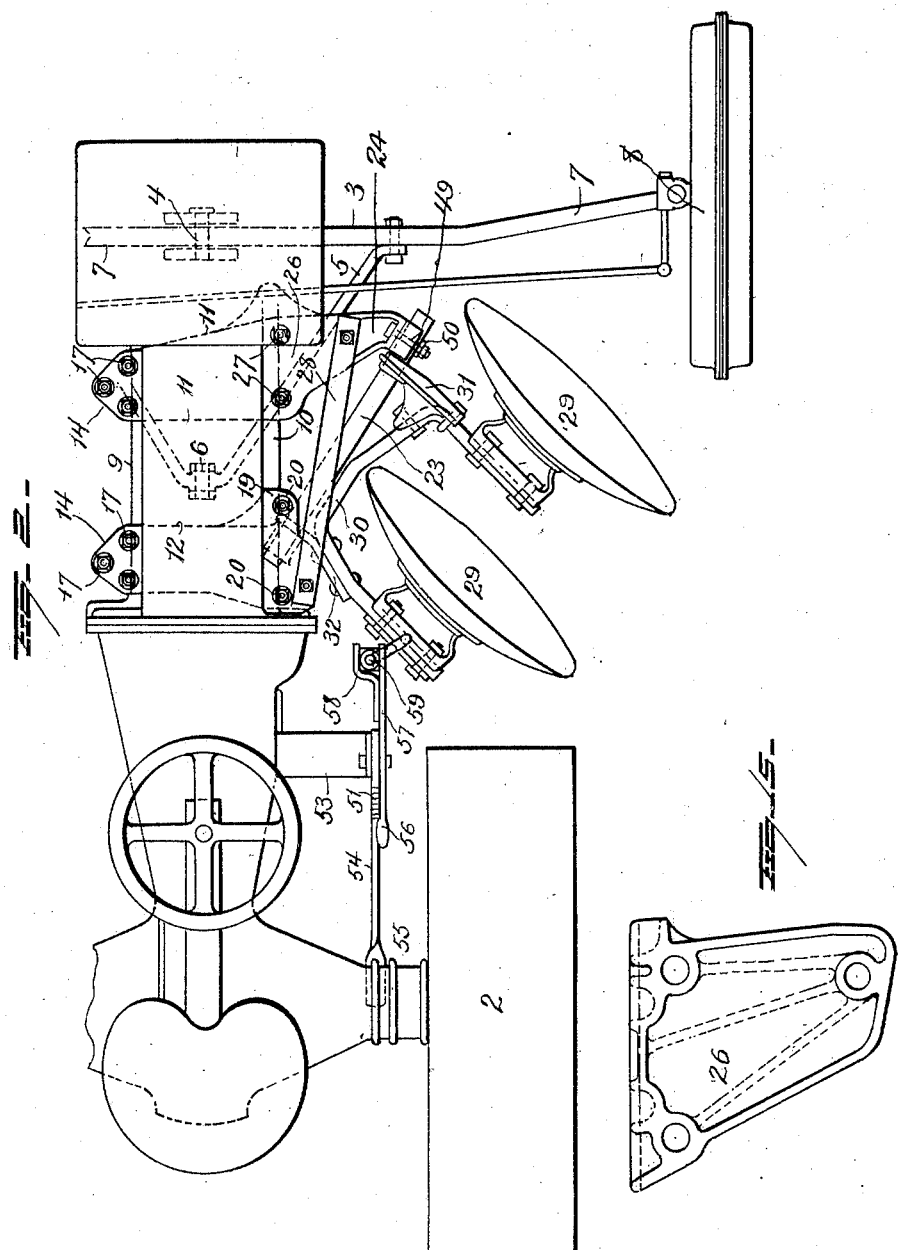

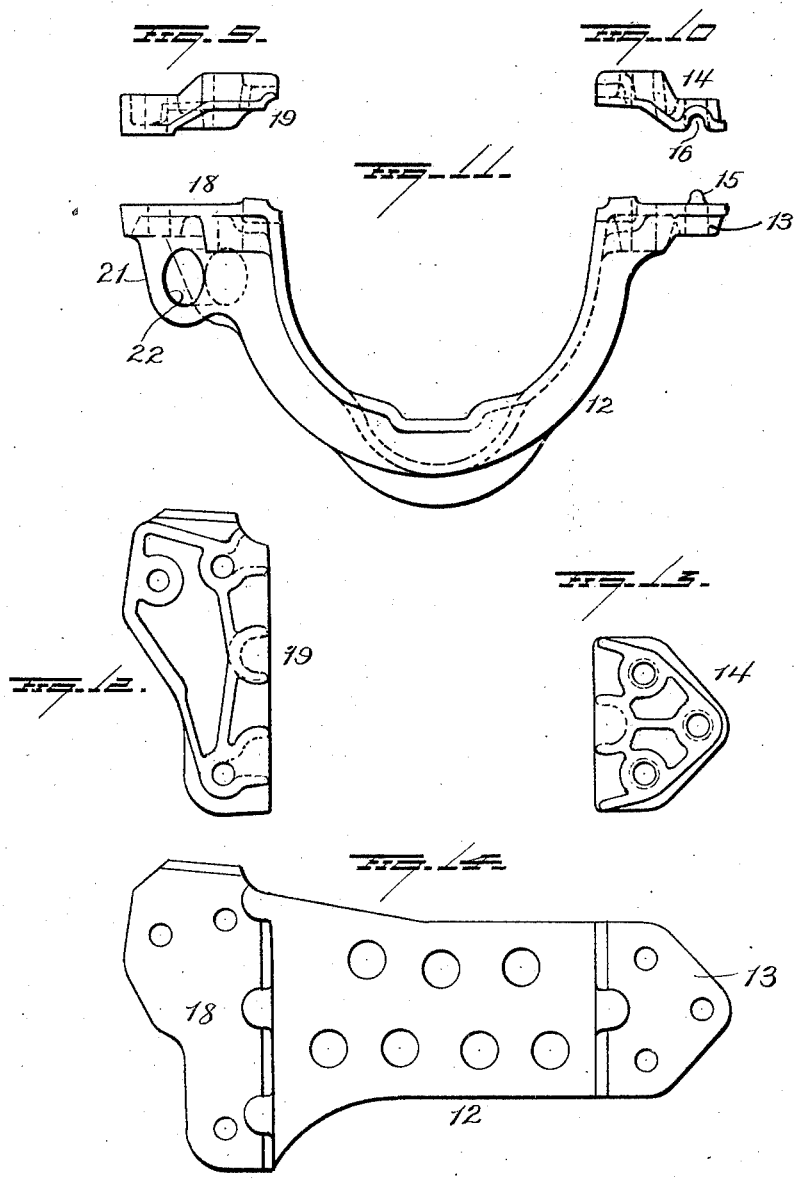

July 2, 1929.  R. J. ALTGELT ET AL  1,719,743
TRACTOR PLOW STRUCTURE
Filed Aug. 13, 1926  5 Sheets-Sheet 5
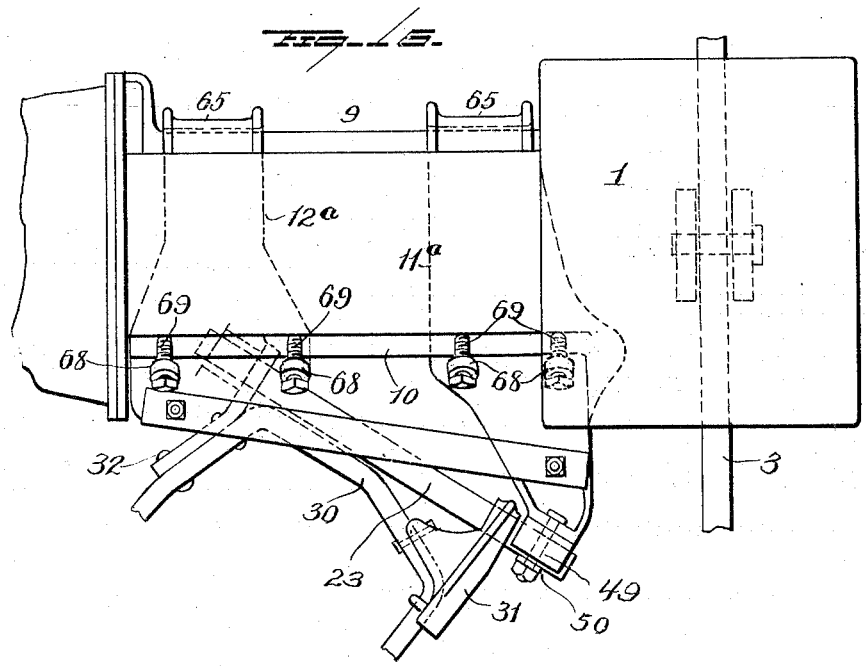
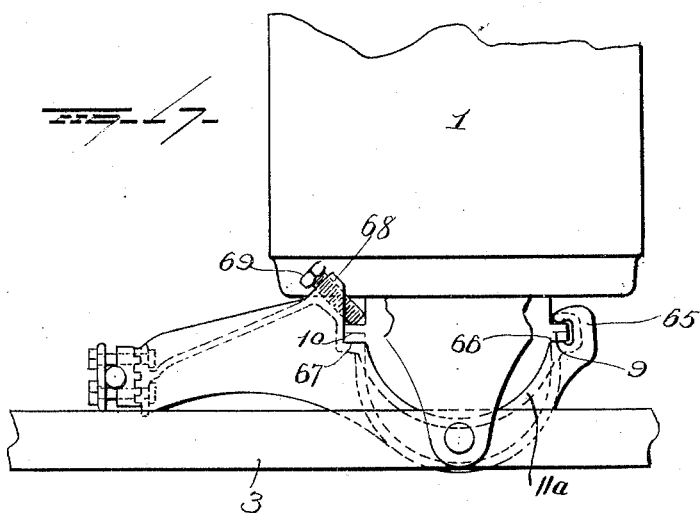
Inventors
R. J. Altgelt and
H. E. Altgelt
By Seymour & Bright
Attorney Patented July 2, 1929.

1,719,743

UNITED STATES PATENT OFFICE.

RUDOLPH J. ALTGELT AND HERMAN E. ALTGELT, OF SOUTH BEND, INDIANA, ASSIGNORS TO OLIVER CHILLED PLOW WORKS, OF SOUTH BEND, INDIANA.

TRACTOR PLOW STRUCTURE.

Application filed August 13, 1926. Serial No. 129,004.

This invention relates to improvements in tractor plow structure and more particularly to that type in which the soil engaging elements are located at one side of the body of the tractor as distinguished from those which trail behind the tractor.

One object of our present invention is to provide simple and efficient means of attachment for soil engaging elements to a tractor so that said elements shall be carried by and located at one side of the body of the tractor.

A further object is to provide carrying means for soil engaging elements, which shall be adaptable to and capable of rigid connection with the body of a tractor independently of the axle of the latter and in such manner that said soil engaging elements shall be disposed at one side of the body of the tractor.

A further object is to provide a plow attachment for a tractor which shall include carrying and attaching means for soil engaging elements, said means being adapted to be clamped to the lateral flanges of the crank case and engine block of a tractor.

A further object is to provide simple and efficient means in a plow structure of the type specified which will permit adjustment for depth of penetration of the forward soil engaging disk.

With these and other objects in view, the invention consists in certain novel features of construction and combinations of parts as hereinafter set forth and pointed out in the claims.

In the accompanying drawings;

Figure 1 is a view in side elevation showing the application of my improvements to a tractor;

Figure 2 is a plan view of the same;

Figure 3 is a partial front view;

Figure 4 is a face view of the forward bracket or stirrup;

Figure 5 is a side view of the same;

Figure 6 is an end view of a portion of said forward bracket or stirrup;

Figures 7 and 8 are detail views of the adjustable shaft or beam supporting block;

Figures 9 and 10 are side views of the clamping blocks for the rear bracket or stirrup;

Figure 11 is a side view of the rear bracket or stirrup;

Figure 12 is a plan view of the clamping block 19 for one end of the rear bracket or stirrup;

Figure 13 is a plan view of the clamping block for one end of either front or rear bracket or stirrup;

Figure 14 is a plan view of the rear bracket or stirrup, and

Figure 15 is a plan view of the clamping block 26 for the front bracket.

Figures 16 and 17 are views showing a modification.

In the drawing, the body of a tractor is represented at 1 provided at its rear end portion with traction wheels, one of which is indicated at 2. The front axle 3 of the tractor is pivotally connected with the forward portion of the tractor body in such manner that said axle may have limited vertical movement on an intermediate horizontal pivot pin 4, and the front axle is also connected with the body of the tractor through the medium of a V-shaped brace 5, having its arms connected with the axle and being connected, at the juncture of said arms, with the body of the tractor by a horizontal pivot pin 6. The front axle is so constructed that one end portion 7 thereof will project sufficiently from one side of the tractor that the steering wheel 8 at this end of the axle will run in a previous furrow, when the soil engaging elements are disposed at the side of the tractor body as hereinafter explained, and the extended portion 7 of the front axle is made to project somewhat forwardly as shown in Fig. 2 so that the offset steering wheel 8 shall be disposed a suitable distance forwardly of the forward soil-engaging disk. The steering wheel (not shown) at the other end of the front axle may occupy its normal position in line with the traction wheel at the same side of the tractor.

Our improvements are well adapted for connection with a tractor of the type shown in the drawings. In tractors of this type, laterally projecting and longitudinally extending flanges indicated at 9, 10, are provided for facilitating the bolting of the engine block to the crank case, and it is to these flanges that our improvements are secured.

Forward and rear brackets or stirrups 11 and 12 partially embrace the body of the tractor, extending under the same and conforming approximately to the contour thereof. At one end, each of the brackets is made with a jaw or extension 13 to be disposed under the flanges 9 on the tractor and to project outwardly beyond the same. Clamping blocks 14 are disposed over the jaws or extensions 13 and engage over the tractor flanges 9. The jaws or extensions 13 may be provided with pins 15 to enter sockets 16 in the clamping blocks to insure proper positioning of the latter. When bolts 17 are passed through holes in the blocks 14 and bracket jaws or extensions 13 and the nuts on said bolts are tightened, said brackets will become securely clamped to the flanges 9 at one side of the tractor body. At the opposite side of the tractor body, the rear bracket is provided with a jaw or extension 18, with which a clamping block 19 cooperates to clamp this end of the rear bracket to the tractor flanges 10, when bolts 20 are passed through said blocks and jaw and the nuts on said bolts tightened. The jaw or extension 18 of the rear bracket is made with an enlargement 21 having a socket 22 in which one end portion of a shaft or beam 23 is disposed.

The forward bracket or stirrup is provided with an arm 24 which projects laterally from the tractor body a greater distance than does the jaw 18 and its enlargement 21 of the rear bracket, so that when the forward end portion of the shaft or beam 23 is secured to said arm 24 (as hereinafter described), said shaft or beam will be disposed at an angle to the tractor body, said shaft or beam extending from the rear bracket in a forward and outward or diagonal direction. A portion of the arm 24 provides a jaw 25 which engages under the tractor flanges 10 to which it is securely clamped with the use of a clamping block 26 and bolts 27. The two brackets will preferably be connected by a tie bar 28 as clearly shown in Fig. 2.

The beam for earth working disks 29—29 is made in the form of an approximately U-shaped bail 30, with the arms of which, said earth working disks are connected. This beam-bail is connected with the diagonal shaft 23 by means of arms 31—32 which are rigidly secured to said beam-bail and loosely mounted on said shaft 23,—the earth working disks being thus disposed, one inwardly and in rear of the other and at one side of the tractor.

It will be noted that the brackets 11 and 12 with their projecting portions, constitute hangers for the shaft 23 with which the soil engaging disks are connected, and that these hangers are rigidly secured solely to intermediate portions of the tractor body independently of the axles of the tractor.

It is desirable that the connection of the shaft 23 with the front bracket or hanger be such that the front end of said shaft shall be adjustable vertically, so that the front disk may be caused to plow deeper or shallower in relation to the rear disk. To accomplish this, the construction now to be described may be employed, said construction serving also to rigidly secure the shaft 23 to the front bracket or hanger. The outer end of the arm 24 of bracket 11 is provided with a bevel wall 33 having ribs or teeth 34 and elongated slots 35 at right angles to said ribs. A block 36 is provided with ribs or teeth 37 to intermesh with the ribs or teeth 34 on the portion 33 of arm 24, and this block is provided with perforated ears 38 for the accommodation of bolts 49 which also pass through a clamping plate 50 engaging the shaft 23, and through the slots 35. The block 36 is made with a recess 36ª which receives the forward end portion of the shaft and in which said shaft is normally secured by the clamping plate 50 and bolts 49. The slots 35 in the wall 33 of bracket arm 24 are so disposed that when the nuts on the bolts 49 are loosened and the block 36 disengaged from the bracket arm 24, the block 36 may be moved vertically to effect vertical movement of the forward portion of the shaft 23 and thus to adjust the depth of penetration of the forward disk with relation to the rear disk.

A toothed segment frame 51 is located near the rear portion of the tractor body and its arm 52 is secured to the bracket 53 while its arm 54 is secured to the rear axle housing 55. A hand lever 56 is pivoted to the arm 52 of the segment frame and provided with a suitable detent to cooperate with the toothed portion of the segment frame. The short arm 57 of the hand lever carries a pivoted collar or sleeve 58 through which a rod 59 passes and to this rod, a collar 60 is secured over the lever arm by means of a set screw 61. The lower end portion of the rod 59 is connected with one of the arms of the beam-bail 30 as indicated at 62. A collar 63 is secured to the lower portion of the rod 59 and between this collar and the lever arm 57, a spring 64 is located on the rod 59,—said spring serving normally to press the disks properly to their work, but permitting them to yield vertically when an obstruction is encountered. By means of the hand lever 56, the beam-yoke and hence the earth-working disks may be raised or lowered and the depth of penetration of said disks may also be regulated by manipulation of said lever.

In the modified construction shown in Figures 16 and 17, each of the brackets or stirrups 11ª and 12ª is provided at one end with a hook portion 65 to engage over the flanges 9 on the tractor and with shoulders 66 to be disposed under said flanges 9. Said brackets or stirrups are also provided with shoulders 67 to engage under the flanges 10 on the tractor and with upwardly projecting portions 68 through which threaded bolts 69 are passed, the lower ends of said bolts engaging over the flanges 10 and spanning the angle formed by the upper flange 10 and the body of the tractor.

Having fully described our invention what

We claim as new and desire to secure by Letters-Patent, is:—

1. In an agricultural implement for attachment to a tractor for operation at one side of the latter, the combination of a shaft, hanger brackets passing transversely beneath the tractor and secured to the opposite sides thereof and projecting laterally from one side of the tractor, the shaft being carried by the laterally projecting ends of the brackets, soil engaging means, and means for connecting said soil engaging means with said shaft.

2. The combination with a shaft to be disposed at one side of a tractor, of means for connecting said shaft to the body of a tractor independently of the axles thereof, said means constructed to be disposed transversely of the tractor and engage the same at respective sides thereof at the bottom of the same between the axles, soil engaging means, and connecting means between said soil-engaging means and said shaft.

3. In an agricultural implement, the combination of two brackets adapted to be disposed transversely beneath a tractor, means for securing each of said brackets at opposite sides of the tractor, a shaft connected with one end portion of each of said brackets, soil engaging means, and means connecting the latter with said shaft, whereby the soil engaging means may be disposed at one side of a tractor.

4. An agricultural attachment for a tractor, comprising two brackets to extend under a tractor transversely, means for securing said brackets to the tractor at both sides thereof, soil engaging means, carrying means for said soil engaging means, said engaging means connected with said carrying means, a supporting shaft for said carrying means, and means for connecting said supporting shaft with one end of each of said brackets.

5. An agricultural attachment for a tractor, comprising two brackets to extend under a tractor transversely, both brackets projecting laterally from one side of the tractor, means for securing said brackets to the tractor at both sides thereof, a tie bar connecting said brackets, soil-engaging means, carrying means for said engaging means, said engaging means connected with said carrying means, a supporting shaft for said carrying means, and means for connecting said supporting means with one end of each of said brackets.

6. An agricultural attachment for a tractor having lateral flanges at its respective sides, comprising two brackets to be spaced apart and disposed transversely of the tractor, means for clamping said brackets to the flanges at respective sides of the tractor, one of said brackets being longer than the other to project a greater distance than the latter from the side of the tractor, a shaft carried by said brackets, soil engaging means, and carrying means for the latter connected with said shaft and capable of vertical swinging movement.

7. An agricultural attachment for a tractor having lateral flanges at its respective sides, comprising two brackets to be spaced apart and disposed transversely of the tractor, means for clamping said brackets to the flanges at respective sides of the tractor, one of said brackets being longer than the other to project a greater distance than the latter from the side of the tractor, a tie bar connecting said brackets, a shaft carried by said brackets, soil engaging means, and carrying means for the latter connected with said shaft and capable of vertical swinging movement.

8. In an agricultural implement for attachment to a tractor, the combination with two brackets to be disposed transversely with respect to a tractor and extend under the same, means for securing each of said brackets to the tractor at both sides thereof, one of said brackets adapted to project laterally from one side of the tractor a greater distance than the other bracket projects from the same side of the tractor, a shaft supported by said brackets, soil engaging means, carrying means for the latter connected with said shaft and capable of vertical swinging movement, and means for raising and lowering said carrying means and the soil engaging means carried thereby.

9. An agricultural attachment for a tractor, comprising brackets to be disposed transversely below a tractor, means for securing said brackets in spaced relation to both sides of the tractor, the brackets being constructed to project different distances laterally from the latter at one side thereof, a shaft carried by the projecting end portions of said brackets, soil engaging means, carrying means for said soil-engaging means, and means loosely mounting said carrying means on said shaft.

10. An agricultural attachment for a tractor, comprising brackets to be disposed transversely beneath a tractor, means for securing said brackets in spaced relation to both sides of the tractor, the brackets being constructed to project different distances laterally from the latter at one side thereof, a shaft carried by end portions of said brackets, soil engaging means, carrying means for said soil-engaging means, means loosely mounting said carrying means on said shaft, and raising and lowering means for said soil engaging means and adapted for connection with said carrying means.

11. In an agricultural implement, the combination with a shaft, attaching means for said shaft to a tractor, said attaching means comprising brackets including means for clamping the same on the two sides of a tractor at the bottom of the same, one of said brackets being longer than the other and both brackets adapted to project laterally from the same side of the tractor whereby said shaft may be disposed at one side of the tractor body and at an angle thereto less than a right angle, soil engaging means, carrying and connecting means for said engaging means connected with said shaft, said soil engaging means and the carrying and connecting means therefor being capable of vertical movement.

12. The combination of a shaft to be disposed at one side of a tractor, hangers for said shaft, means for securing said hangers to the tractor, soil engaging members connected with said shaft, and means for effecting vertical adjustment of one end of said shaft, said means comprising a block having interlocking relation to the adjacent hanger, the latter being slotted, said block having a recess receiving said shaft, a clamping plate and bolts passing through said clamping plate, block and the slotted portion of said hanger.

13. The combination with a tractor having side flanges on its body, of two brackets spaced apart and extending under the tractor body, means clamping said brackets to the flanges of the tractor body at respective sides of the latter, one of said brackets having a part projecting farther laterally from the tractor than the other, a shaft supported by said brackets and disposed at an acute angle relatively to the tractor, said shaft terminating at its forward end rearwardly of the front axle of the tractor, a yoke-beam mounted on said shaft, and soil-engaging members carried by the arms of said yoke-beam.

In testimony whereof, we have signed this specification.

RUDOLPH J. ALTGELT.
HERMAN E. ALTGELT.